No. 838,509. PATENTED DEC. 11, 1906.
D. F. O'BRIEN.
HYDRANT AND VALVE MECHANISM FOR THE SAME AND OTHER PURPOSES.
APPLICATION FILED OCT. 13, 1902.
3 SHEETS—SHEET 2.
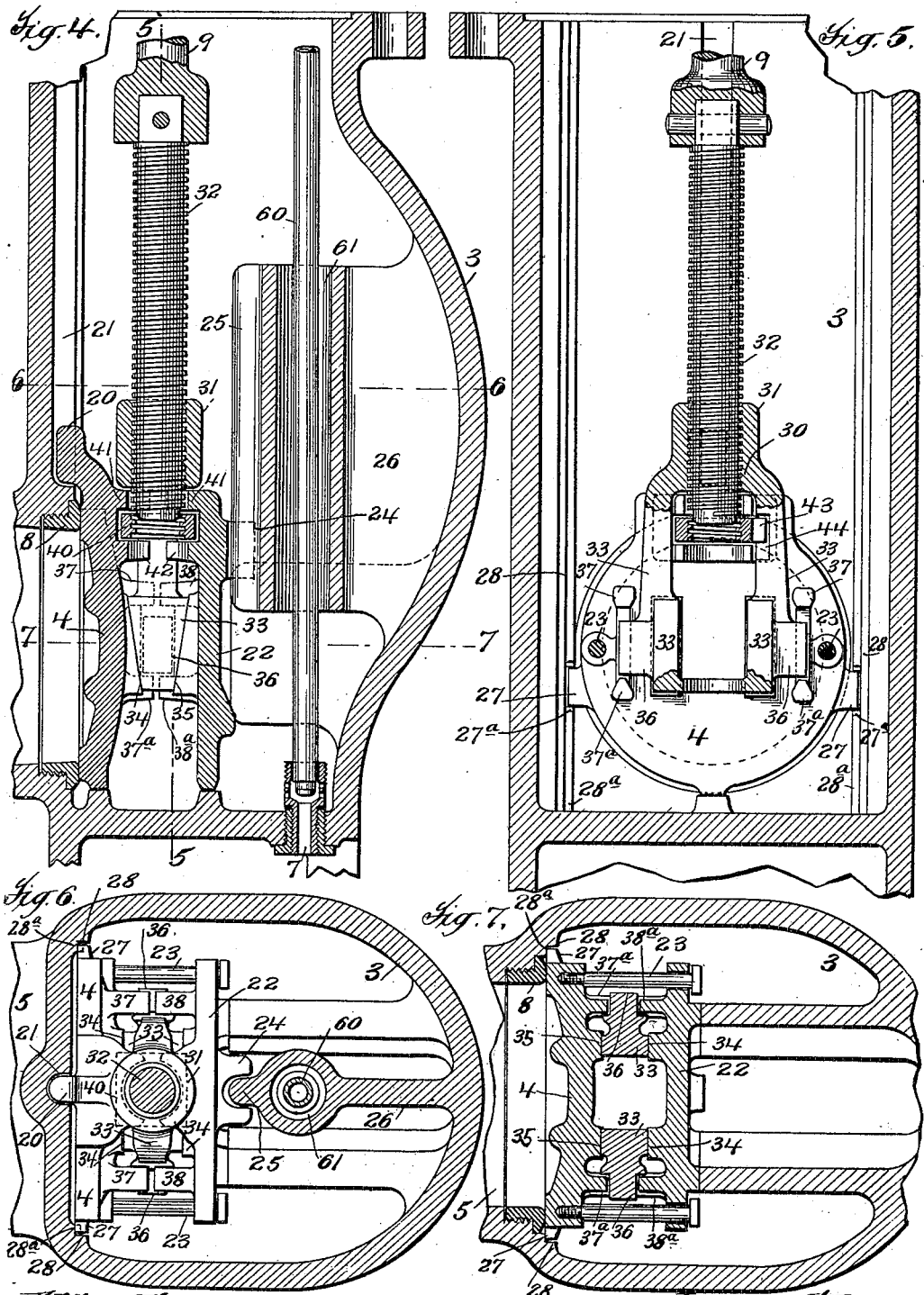

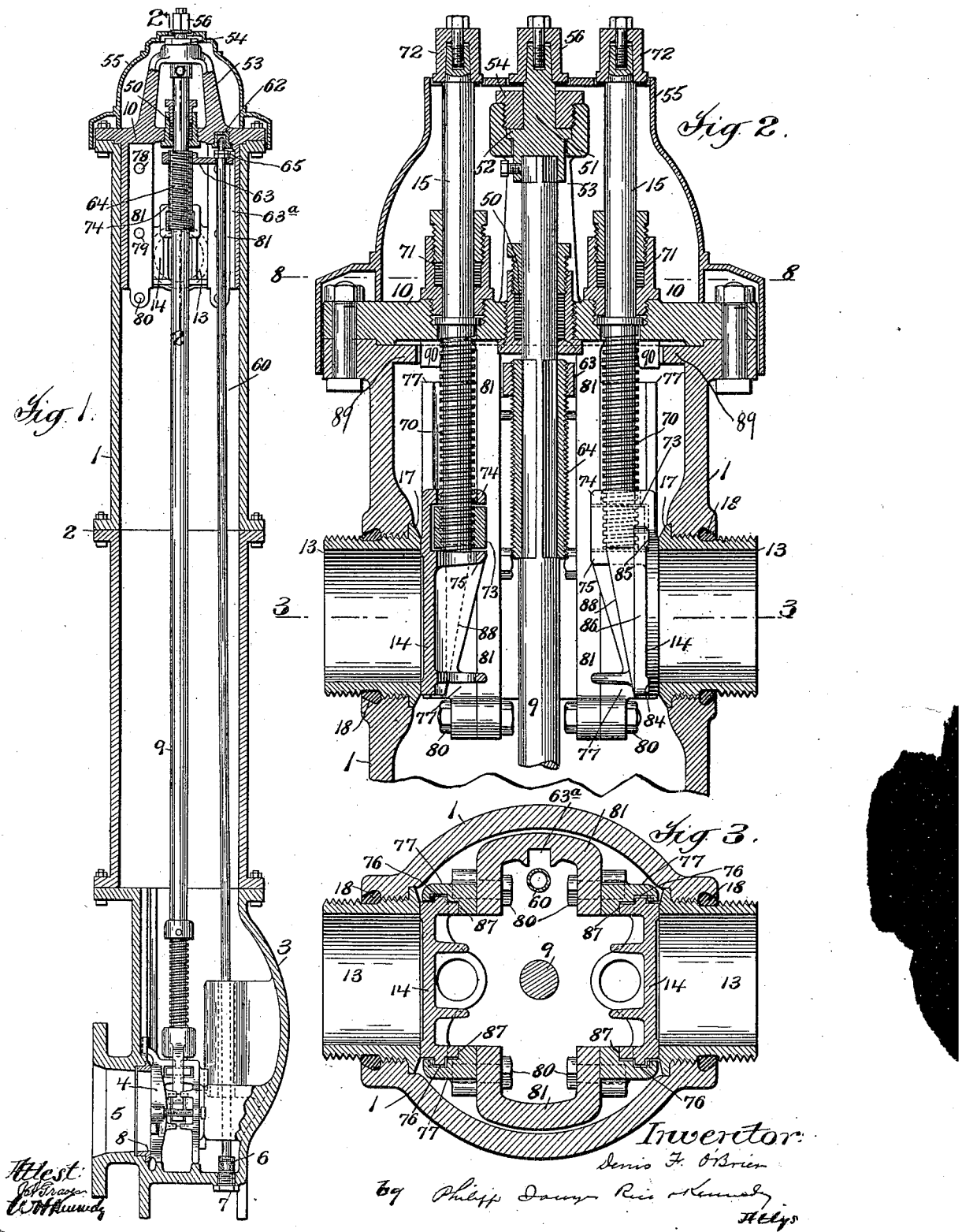
No. 838,509. PATENTED DEC. 11, 1906.
D. F. O'BRIEN.
HYDRANT AND VALVE MECHANISM FOR THE SAME AND OTHER PURPOSES.
APPLICATION FILED OCT. 13, 1902.
3 SHEETS—SHEET 1.

No. 838,509.  PATENTED DEC. 11, 1906.
D. F. O'BRIEN.
HYDRANT AND VALVE MECHANISM FOR THE SAME AND OTHER PURPOSES.
APPLICATION FILED OCT. 13, 1902.
3 SHEETS—SHEET 3.
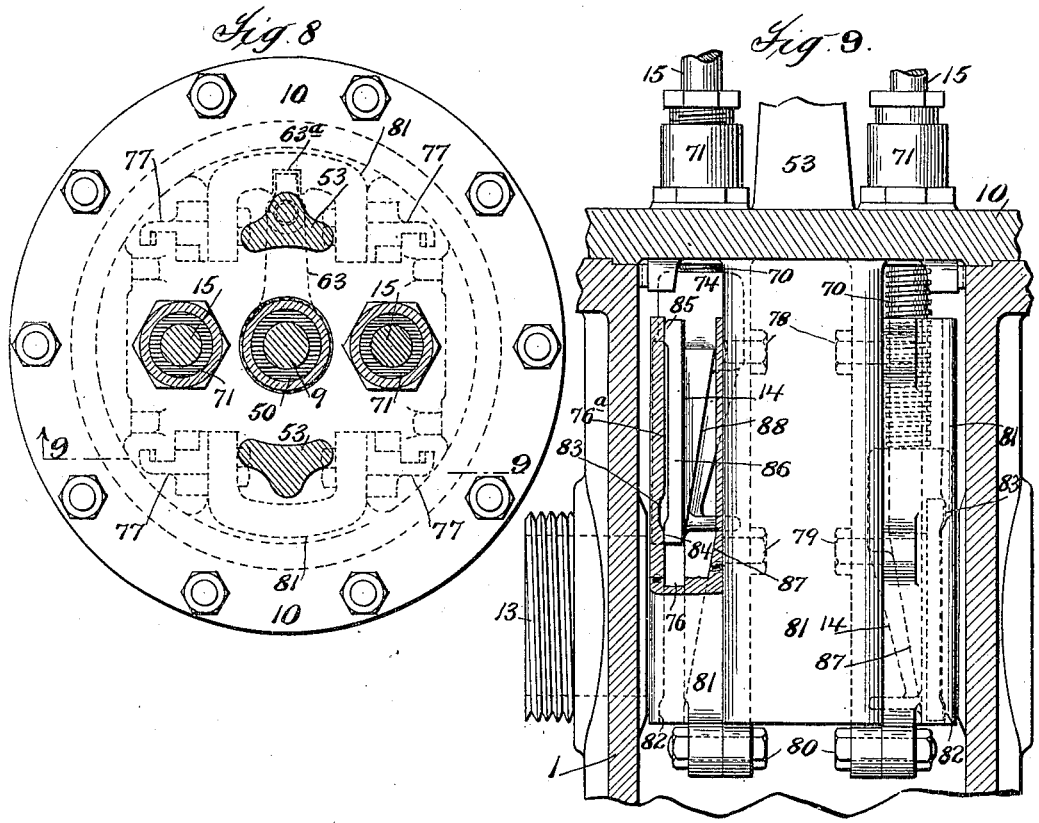
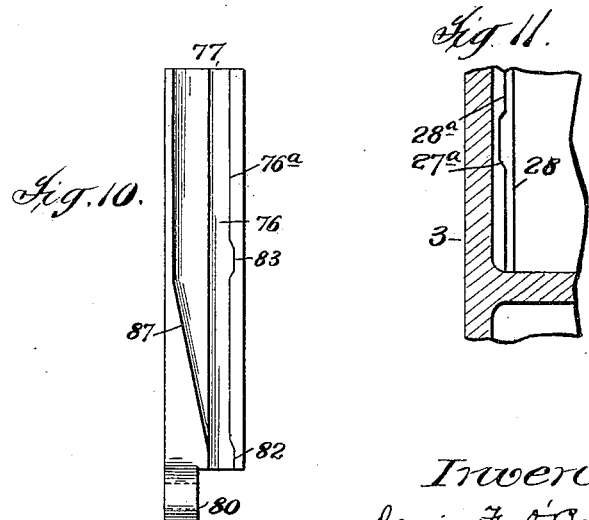

UNITED STATES PATENT OFFICE.

DENIS F. O'BRIEN, OF NEWARK, NEW JERSEY.

HYDRANT AND VALVE MECHANISM FOR THE SAME AND OTHER PURPOSES.

No. 838,509.  Specification of Letters Patent.  Patented Dec. 11, 1906.

Application filed October 13, 1902. Serial No. 127,017.

*To all whom it may concern:*

Be it known that I, DENIS F. O'BRIEN, a citizen of the United States, residing at Newark, county of Essex, and State of New Jersey, have invented certain new and useful Improvements in Hydrants and Valve Mechanisms for the Same and other Purposes, fully described and represented in the following specification and the accompanying drawings, forming a part of the same.

This invention relates particularly to improvements in hydrants of the class known as "fire-hydrants," which are provided with an inlet for connection to a water-main and with outlets for connection to hose-piping, which inlet and outlets are controlled by vertically-movable gate-valves.

One of the objects of the present invention is to provide a hydrant comprising a casing and a head therefor bearing the gate-valves, such casing and head being of peculiar construction in that they are provided with interlocking means so formed and so arranged that the interlocking means upon one will engage the interlocking means upon the other only when the head is brought to such position upon the casing that the valves carried thereby will be in register with the inlet and outlets which they are to control.

Another object of the present invention is to provide controlling means for the main inlet-valve, constructed and arranged in such manner that as the opening movement of such valve is initiated it will be caused to move away slightly from its seat, so that while it is being slid or moved vertically by its operating mechanism to opening position the face of the valve will not contact with and grind against its seat, such controlling means operating, after the valve is returned to closing position, to move the valve inwardly toward its seat and hold it positively in that position against the pressure in the main to which the casing is connected. These improvements in valve mechanism, though designed particularly for use in hydrants, are capable of use in other structures, and such other uses are to be considered as within the present invention.

Another object of the present invention is to provide means whereby the valves controlling the outlets of the casing will, as the opening movement thereof is commenced, move the valves away from their seats, so as to prevent grinding and wear between the surfaces of the valves and seats, and which as the return or closing movement of the valves is completed will move said valves toward and hold them positively in contact with their seats. These improvements also are capable of use in structures other than hydrants, and the present invention includes such other uses to which they may be applied.

It is the object of the present invention also to improve the construction of hydrants in particulars other than those above referred to, which will be hereinafter more particularly pointed out.

In the accompanying drawings, Figure 1 is a vertical sectional elevation of a fire-hydrant embodying the several improvements of the present invention. Fig. 2 is a section thereof, on an enlarged scale, taken on the line 2 of Fig. 1. Fig. 3 is a horizontal section on the line 3 of Fig. 2. Fig. 4 is a vertical section, on an enlarged scale, taken through the lower end of the hydrant-casing and illustrating more particularly the main inlet-valve and the drip-valve for controlling the drip from the hydrant-casing to prevent freezing of water in the main-valve casing, together with means for guiding the main valve and the drip-valve in their vertical movements. Fig. 5 is a section taken on the irregular line 5 of Fig. 4. Fig. 6 is a horizontal section on the line 6 of Fig. 4. Fig. 7 is a horizontal section taken on the line 7 of Fig. 4. Fig. 8 is a horizontal section taken on the line 8 of Fig. 2. Fig. 9 is a vertical section on the line 9 of Fig. 8. Fig. 10 illustrates in detail one of the guides for causing lateral movement of each one of the outlet-valves from and to its seat at the beginning of its upward or opening movement and at the end of its downward or closing movement, respectively; and Fig. 11 is a detail illustrating the means for moving and holding the main inlet-valve from its seat while it is being moved to open or closing position.

Referring to said drawings, 1 represents the hydrant-casing, which may be made in two sections, bolted together, as shown at 2, and 3 the main-valve casing, which is bolted to the hydrant-casing and which contains a gate-valve 4 for controlling the inlet 5 from the water-main, and 6 a drip-valve controlling the drip-opening 7 for the escape of water from the main-valve casing when the main valve 4 is closed, so as to prevent collecting or freezing of water within the main-valve casing.

The inlet 5 from the main is provided with an annular seat 8 for the valve 4, which valve in opening and closing is moved or slid vertically across the inlet 5 by a spindle 9, mounted in the head 10 of the hydrant. The casing 1 is also provided with one or more outlets, each provided with a nozzle 13, screw-threaded in the casing and projecting therefrom into position for coupling to a hose-pipe. The inner ends of said nozzles 13 form seats for vertically-movable gate-valves 14, controlling said outlets, these valves 14 being operated by spindles 15, mounted in the head 10. The hose-connecting nozzles 13 are connected to the hydrant-casing in a peculiar way—that is to say, they are threaded in the outlets by being introduced therein from inside the casing instead of from the outside and are provided with flanges 17, which by engagement with the inner wall of the casing prevent outward movement of the nozzles. By reason of this peculiar connection all danger of leakage at the outlets is avoided, as the water-pressure within the hydrant exerted against the nozzles 13 has no loosening effect, but rather a tightening effect upon the nozzles. Between the nozzles 13 and the annular outlets are preferably interposed suitable packing-rings 18.

The main valve and its actuating mechanism, which are peculiar in construction and in method of operation, will now be described in detail, reference being had particularly to Figs. 1 and 4 to 7. The valve itself is, as shown in Fig. 5, disk-like in shape and is provided at its upper end with a projection 20, entering a vertical guideway 21, formed in the valve-casing 3. In rear of said valve 4 there is provided a plate 22, loosely connected to the valve 4 by bolts 23, secured to said valve and passing through openings in said plate 22, the purpose of this loose connection being to permit spreading apart of the valve 4 and said plate 22 in order to move the valve 4 to its seat and to permit said valve 4 to move inwardly toward the plate 22 and away from its seat 8 and to remain in that position as the valve is moved upwardly or downwardly by its actuating-spindle 9. The plate 22 is also provided with means for guiding said plate in its vertical movement with the valve 4, such means consisting of a bifurcated guide 24, formed on the rear face of the plate 22 and which straddles the edge 25 of a guiding rib or projection 26, formed upon the inner wall of the valve-casing 3.

It will be obvious from the foregoing that as the valve 4, and with it the plate 22, is moved vertically in either direction the guide 20, moving in the guideway 21, and the guide 24, moving along the guiding edge 25 of rib 26, will tend to maintain said valve 4 against displacement laterally or edgewise in the casing. Such displacement of the valve 4 during its vertical movements is further guarded against by the provision of lugs 27, formed upon the edge of valve 4, the outer ends of which engage ribs or shoulders 28, formed in the valve-casing 3 on opposite sides of the valve 4, as best illustrated in Figs. 6 and 7. These lugs 27 also perform another function, which will be hereinafter described.

The valve 4 is, like other valves in hydrants of the class illustrated in the drawings, exposed to the pressure of the main, which has a tendency to unseat the valve. It is necessary, therefore, in order to prevent leakage that some means be provided for holding the valve 4 positively to its seat, so as to resist such tendency of the main-pressure to unseat it. Such means are provided by the present invention, the means so provided accomplishing not only this result, but also the further and probably more important result of causing the valve 4 to move away from its seat as the upward or opening movement of the valve is initiated and remain out of contact with its seat during such upward movement and also during its downward or closing movement until the latter movement is completed. This latter function is important, because if the valve 4 were permitted to remain in contact with its seat 8 during its vertical movements the faces of the valve and its seat would grind upon each other and speedily become worn, thus producing leakage between the valve 4 and its seat. The means provided by the present invention for these two purposes will now be described. The means for moving the valve 4 to its seat when it is moved to closing position and holding it there against the pressure of the main consist of a member 30, the hub 31 whereof is threaded, so as to be engaged by the threaded portion 32 of the spindle 9, and which is provided with depending arms 33 on opposite sides of spindle 9, said arms 33 being inclined on opposite sides, so as to engage and coact with four reversely-inclined projections 34 35 upon the inner faces of the valve 4 and its rear plate 22. When the spindle 9 is rotated so as to open the valve 4 by moving the same vertically, it will be understood that the member 30 (which is prevented from rotation by the engagement of its depending arms 33 between the valve 4 and plate 22) will travel upward along the threaded portion 32 of the spindle, this withdrawing its wedge-shaped or inclined arms 33 from between the inclined portions 34 35 upon the valve 4 and its rear plate 22, when the valve 4 is free to be moved inwardly from its seat by the pressure of the main or to be moved positively from its seat by the means which will now be described. These means consist of a pair of vertical ribs or guides 28$^a$ at right angles to ribs or guides 28 and against which the faces of the lugs 27 bear during the vertical movement of valve 4. Each of the ribs or guides 28$^a$ has a recess 27$^a$, which receives the lug 27 in the closed position of the valve 4. (See Fig. 11.) As soon, however, as the upward or opening movement of the valve is initiated the lugs 27 will ride up the inclined upper ends of the recesses 27$^a$ onto the straight plane faces of ribs 28$^a$, and thus move the valve 4 away from its seat, so that upon the further rotation of the spindle 9 the valve 4 will move upwardly through the valve-casing 3, with its face out of contact with the seat 8 and casing above it, and will remain out of contact therewith throughout such upward movement and also throughout its downward or closing movement and until such closing movement is about completed, when, as will presently be described, the member 30 will be moved downwardly by the threaded portion 32 of spindle 9 into engagement with the inclined projections 34 35 on the inner faces of the valve 4 and plate 22, with the result that it will force said valve and plate apart and cause the former to move into contact with its seat 8, where it is positively held by the wedge-shaped or inclined arms 33 against the pressure of the main, the lugs 27 then again entering the recesses 27$^a$.

As just described, when the spindle 9 is turned to move the valve 4 upwardly to open position the first effect of such rotation of the spindle 9 is to withdraw the wedge-shaped arms from between valve 4 and plate 22, when the pressure of the main may force the valve 4 out of contact with its seat 8. The effect of further rotation of the spindle 9 is to then raise the valve 4 to uncover the inlet-opening 5. This upward movement of the valve 4, and with it its plate 22, upon such further rotation of the spindle 9 is effected by the engagement of lateral projections 36 upon the wedge-shaped or inclined arms 33 with two sets of stops 37 38, projecting inwardly toward each other from valve 4 and plate 22, the engagement of said projections 36 with stops 37 38 causing the valve 4 and plate 22 to move upwardly with the member 30 along the threaded portion 32 of spindle 9. As the valve is thus moved upward the lugs 27 will, as before described, move up the inclined ends of recesses 27$^a$ and then ride along the plain faces of ribs 28$^a$, and thus move and maintain the valve 4 out of contact with the face of its seat during its upward movement and also during its downward movement and until lugs 27 again come into line with recesses 27$^a$.

Upon the return or downward movement of the valve 4 to closing position it is necessary that downward movement and wedging action of the member 30 relatively to valve 4 should be prevented. This is accomplished in the present case by the provision of a nut 40, contained within a recess formed by shoulders or guides 41 42, projecting inwardly toward each other from the inner faces of the valve 4 and its plate 22, as best illustrated in Figs. 4 and 5. The nut 40 is square in cross-section, and the inner wall of the recess is straight, so that the nut is prevented from turning. The nut 40 is also provided with a projection 43, adapted to enter a recess 44 in one of the arms 33, as shown in Fig. 5. This projection and recess are provided as a guide for introducing the nut into the recess between shoulders 41 42, so that its screw-thread will be properly positioned for engagement by the threaded portion 32 of spindle 9. Normally, or while the valve 4 is in closing position, the nut 40 is out of engagement with the threaded portion 32 of the spindle 9. As soon, however, as the valve 4 and its plate 22 are raised and caused to move upwardly along the threaded portion 32 of the spindle by the engagement of the lateral projections 36 on arms 33 with the stops 37 38 upon the valve 4 and plate 22, as just described, the nut 40 will be moved upwardly by the shoulders 42 into engagement with the threaded portion 32 of the spindle 9. During the further rotation of the spindle 9 to raise the valve 4 the nut 40 (which, as before stated, is prevented from turning) will travel with valve 4, plate 22, and member 30 along the threaded portion 32 of the spindle 9. Upon the reversal of the spindle 9 to move the valve 4 downwardly to closing position movement of the member 30 along the threaded portion 32 of the spindle and relatively to the valve 4 will be prevented by the nut 40 until the valve 4 has about reached its lower limit of movement, when the nut 40 will become disengaged from the threaded portion of the spindle 9 and drop therefrom, thus leaving the member 30 free to move downwardly upon the threaded portion 32 of spindle 9 and relatively to the valve 4 and plate 22, (which meanwhile have come to rest upon the bottom of the valve-casing 3,) with the result that the wedge-shaped or inclined arms 33 of said member 30 will again be brought into engagement with the inclined projections 34 35 upon the valve 4 and its plate 22 and moving downwardly between such projections 34 35 will spread the valve 4 and plate 22 apart, thus forcing the valve 4 against its seat 8.

The stops 37 38 above described, in addition to their function of coöperating with projections 36 on member 30 to raise valve 4 and plate 22, also perform the function of limiting the movement inwardly toward each other of the valve 4 and plate 22. Additional stops 37$^a$ 38$^a$ are provided at the lower end of the valve and plate for so limiting this inward movement of the plate and valve.

The spindle 9 is supported, as before stated, in the head 10 of the hydrant, the upper end of said spindle passing through a stuffing-box 50 in said head and being connected to a plug 51, provided with a flange 52, resting upon a shoulder formed in a recess in a bridge-piece 53, projecting upwardly from the head 10, said plug being held in said recess by a threaded nut 54, through which the upper end of the plug 51 passes, as best illustrated in Fig. 2. The upper end of the plug 51 passes through a central opening in a hood 55, with which the hydrant is provided, and has secured to it a polygonal-shaped cap 56, adapted for the reception of a wrench for rotating the spindle 9.

The drip-valve 6 is provided with a rod 60, which passes through a guideway 61 in the rib 26, the upper end of which rests in a recess 62 on the under side of the head 10. The drip-valve 6 is operated through the spindle 9, so as to close the drip-opening 7 when the main valve 4 is open and to open said drip-opening when the valve 4 is closed, the purpose of so closing the valve being to prevent waste of water when the hydrant is open to the main, and the purpose of so opening said drip-opening when the main valve is closed being to prevent water collecting and freezing in the valve-casing. The connections for operating the drip-valve 6 from the spindle 9 consists of an arm 63, mounted upon a threaded portion 64 of the spindle 9 and encircling the drip-valve rod 60, which is provided above said arm with adjustable nuts 65, adapted to be engaged by said arm as it is moved upwardly by the threaded portion 64 of spindle 9. The arm 63 is prevented from turning by the engagement of the outer end thereof with a guideway 63ª in the casing 1, which permits movement of said arm endwise of spindle 9 as the latter is rotated. The arrangement of the screw-threads on the portion 64 of spindle 9 is the reverse of that upon the threaded portion 32 of said spindle, so that when said spindle is rotated to move the main valve 4 upwardly the threaded portion 64 of said spindle will move the arm 63 downwardly, thereby permitting the rod 64 to descend, so that the drip-valve 6 will close the drip-opening 7, this movement of the valve 6 taking place before the main valve 4 is opened. When the spindle 9 is turned in the opposite direction to move the valve 4 downwardly, so as to close the inlet 5, the arm 63 will be moved upwardly by the threaded portion 64 of the spindle 9 and engaging the nuts 65 will raise the rod 60 so as to open the drip-opening 7, this movement of the rod 60 and drip-valve 6, however, not taking place until the downward or closing movement of the valve 4 is completed.

The valve mechanism for controlling the outlets 13 at the upper end of the valve-casing, which is novel in construction and method of operation, will now be described in detail. As each of these valve mechanisms is the same in construction and method of operation, a description of one will suffice for an understanding of both, it being understood, however, that these two valve mechanisms are independent and independently operated, so that one may be operated to open one of the outlets while the other remains in position to close the other outlet. Selecting, therefore, the valve mechanism at the left of Fig. 2, the valve 14 thereof is loosely mounted upon the threaded portion 70 of its spindle 15, which spindle is supported by a flange thereon in a recess formed in the head 10, the portion of said spindle above said flange passing through a stuffing-box 71 and thence through an opening in the hood 55, where it is provided with a polygonal-shaped cap-piece 72, adapted for the reception of a wrench. The loose mounting just referred to of the valve 14 upon its actuating-spindle 15 is for the purpose of permitting a slight amount of movement of such valve away from its seat, so as to avoid grinding contact and wear between the surfaces of the valve and its seat as the valve is moved vertically to and from closing position. Such loose connection between the valve 14 and its spindle 15 is secured by connecting the valve to the spindle indirectly, as by the intervention of a nut 73 upon the lower end of the threaded portion 70 of the spindle, this nut being square, so as to be held against turning, and thus to move endwise on rotation of spindle 15 and when so moved engaging upper or lower projections 74 75 upon the valve, and thus moving the valve up or down, as the case may be. The projections 74 75 embrace the threaded portion 70 of the spindle loosely, so as to permit of the slight amount of movement of valve 14 away from its seat before referred to. To insure the introduction of the nut 73, so that its thread will register with the threaded portion 70 of spindle 15 and be engaged thereby, said nut is wider on one side of its axis than on the other, which is the side that must be brought against the inner wall of the recess (see Fig. 2) to secure such register.

Means are provided for positively moving and holding valve 14 away from its seat when it is being moved upwardly to open position and also keeping it away from its seat when it is being moved downwardly to closing position. The means for this purpose provided by the present invention for each valve 14 consists of a pair of guideways 76, formed in a pair of strips 77, bolted at 78 79 80, Figs. 1 and 9, to hangers 81, integral with and projecting downwardly from the head 10. The outer wall 76ª of each of these guideways 76 has a pair of depressions or recesses 82 83 for receiving lugs of projections 84 85, formed on ribs 86, projecting from the sides of the valve when the valve is in closed position, the wall 76ª and ribs 86, except for these recesses 82 83 and projections 84 85, being plain and parallel, so as to make a close fit (in the closed position of the valve) to prevent leakage. The projections 84 85, as will be observed, are located at or near the lower and upper ends of the valve 14 and on opposite sides of the horizontal center thereof, so as to prevent tilting of the valve while being moved, and thus insuring its movement up and down with all portions of it out of contact with the valve-seat. The strip 77, referred to, is shown in detail in Fig. 10, the strip here shown, however, being one of those for the valve 14 at the right of Fig. 9.

While the valve 14 is closed, the projections 84 85 rest in the recesses 82 83, as just stated; but when the spindle 15 is turned to raise the valve to open position the lugs or projections 84 85 will during the first part of such movement of the spindle ride up the inclined ends of recesses 82 83 and leave the same and then ride along the plain portions of the walls 76ª, thus causing the valve 14 to move away from its seat and to remain away from its seat during its upward movement and throughout its return or closing movement, as best illustrated in Fig. 9. Upon the completion of the downward or closing movement of the valve 14 the valve 14 is moved and held positively against its seat by means consisting of inclined members 87, formed on strips 77, which as the valve 14 descends engage correspondingly-inclined members 88, carried by the valve and when so engaged therewith force the valve inwardly toward and hold it firmly against its seat.

The head 10, which carries the different valves and valve-actuating mechanisms, and the casing 1 are of peculiar and novel construction in that said head and casing are provided with interlocking means, which will engage only when the head 10 is introduced into the casing in such way that the valve mechanisms carried thereby are in register with their respective inlet and outlet openings. The interlocking means for this purpose shown herein consist of two face-plates 89 on the interior of the casing 1 and lugs 90, projecting downwardly from the under side of the head and adapted to engage said face-plates, as shown in Figs. 2 and 8, but not adapted to enter the casing 1 in any other position.

What I claim is—

1. The combination of main-inlet gate-valve 4, loosely-mounted member 22 in rear thereof, spindle 9, inclined member 33 movable along the spindle with and also relatively to the valve and loosely-mounted member 22, stationary recessed guides 28ª, and lugs 27 on the valve for moving the latter away from its seat, substantially as described.

2. In a hydrant, the combination with a valve movable across its seat to open and closing positions and also to and from its seat, of means for positively moving and holding it away from its seat throughout its opening and closing movements, said means operating against the valve at suitable points on opposite sides of its horizontal center to prevent tilting of the valve, and means for positively moving and holding it against its seat when returned to closing position, said means comprising a suitably-formed stationary member and a member coacting therewith and movable with the valve, substantially as described.

3. In a hydrant, the combination with a valve movable across its seat to open and closing positions and also to and from its seat, of means for positively moving and holding it away from its seat throughout its opening and closing movements, said means operating against the valve at suitable points on opposite sides of its horizontal center to prevent tilting of the valve, and means for positively moving and holding it against its seat when returned to closing position, said means comprising a stationary member and a member coacting therewith and movable with the valve, one of said members being inclined, substantially as described.

4. In a hydrant, the combination with a valve movable across its seat to open and closing positions and also to and from its seat, of means for positively moving and holding it away from its seat throughout its opening and closing movements, said means operating against the valve at suitable points on opposite sides of its horizontal center to prevent tilting of the valve, and means for positively moving and holding it against its seat when returned to closing position, said means comprising a stationary member and a member coacting therewith and movable with the valve, both of said members being inclined, substantially as described.

5. In a hydrant, the combination with an outlet-valve movable across its seat to open and closing positions and also to and from its seat, of means for positively moving and holding it away from its seat throughout its opening and closing movements, said means operating against the valve at suitable points on opposite sides of its horizontal center to prevent tilting of the valve, and means for positively moving and holding it against its seat when returned to closing position, said means comprising a suitably-formed stationary member and a member coacting therewith and movable with the valve, substantially as described.

6. In a hydrant, the combination with an outlet-valve movable across its seat to open and closing positions and also to and from its seat, of means for positively moving and holding it away from its seat throughout its opening and closing movements, said means operating against the valve at suitable points on opposite sides of its horizontal center to prevent tilting of the valve, and means for positively moving and holding it against its seat when returned to closing position, said means comprising a stationary member and a member coacting therewith and movable with the valve, one of said members being inclined, substantially as described.

7. In a hydrant, the combination with an outlet-valve movable across its seat to open and closing positions and also to and from its seat, of means for positively moving and holding it away from its seat throughout its opening and closing movements, said means operating against the valve at suitable points on opposite sides of its horizontal center to prevent tilting of the valve, and means for positively moving and holding it against its seat when returned to closing position, said means comprising a stationary member and a member coacting therewith and movable with the valve, both of said members being inclined, substantially as described.

8. In a hydrant, the combination of an inlet-valve and a plate in rear of and loosely connected with said valve, a spindle for opening and closing the valve and provided with means for spreading said valve and plate apart to seat the valve, a drip-valve, a spindle therefor, connections between said spindles for raising and lowering and thus opening and closing the drip-valve, and a guide for the drip-valve spindle located in the valve-casing above the drip-valve seat and also serving as a guide for said plate, substantially as described.

9. In a hydrant, the combination of an inlet-valve and a plate in rear of and loosely connected with said valve, a spindle for opening and closing the valve and provided with means for spreading said valve and plate apart to seat the valve, a drip-valve, a spindle therefor, connections between said spindles for raising and lowering and thus opening and closing the drip-valve, and a guideway 61 for the drip-valve spindle located in the valve-casing above the drip-valve seat and also serving as a guide for said plate, substantially as described.

10. The combination with a hydrant-casing, of a removable head therefor bearing the hydrant valve or valves and operating spindle or spindles therefor, said casing and head being provided with interlocking parts which will not engage except in one horizontal position of the head upon the casing, and in which position said head accurately positions the valve or valves within the casing relatively to the valve seat or seats whereby said valve or valves and operating spindle or spindles therefor may be secured in place upon the head and introduced into and accurately positioned in the casing by the application of the head to the casing, and may also be removed from the casing with the head as the latter is removed, substantially as described.

In testimony whereof I have hereunto set my hand in the presence of two subscribing witnesses.

DENIS F. O'BRIEN.

Witnesses:
J. A. GRAVES,
W. H. KENNEDY.